Inventors
Leonard U. Rastrelli
Russell D. Williams
Eugene L. Anderson

By Richard J. Miller
Atty.

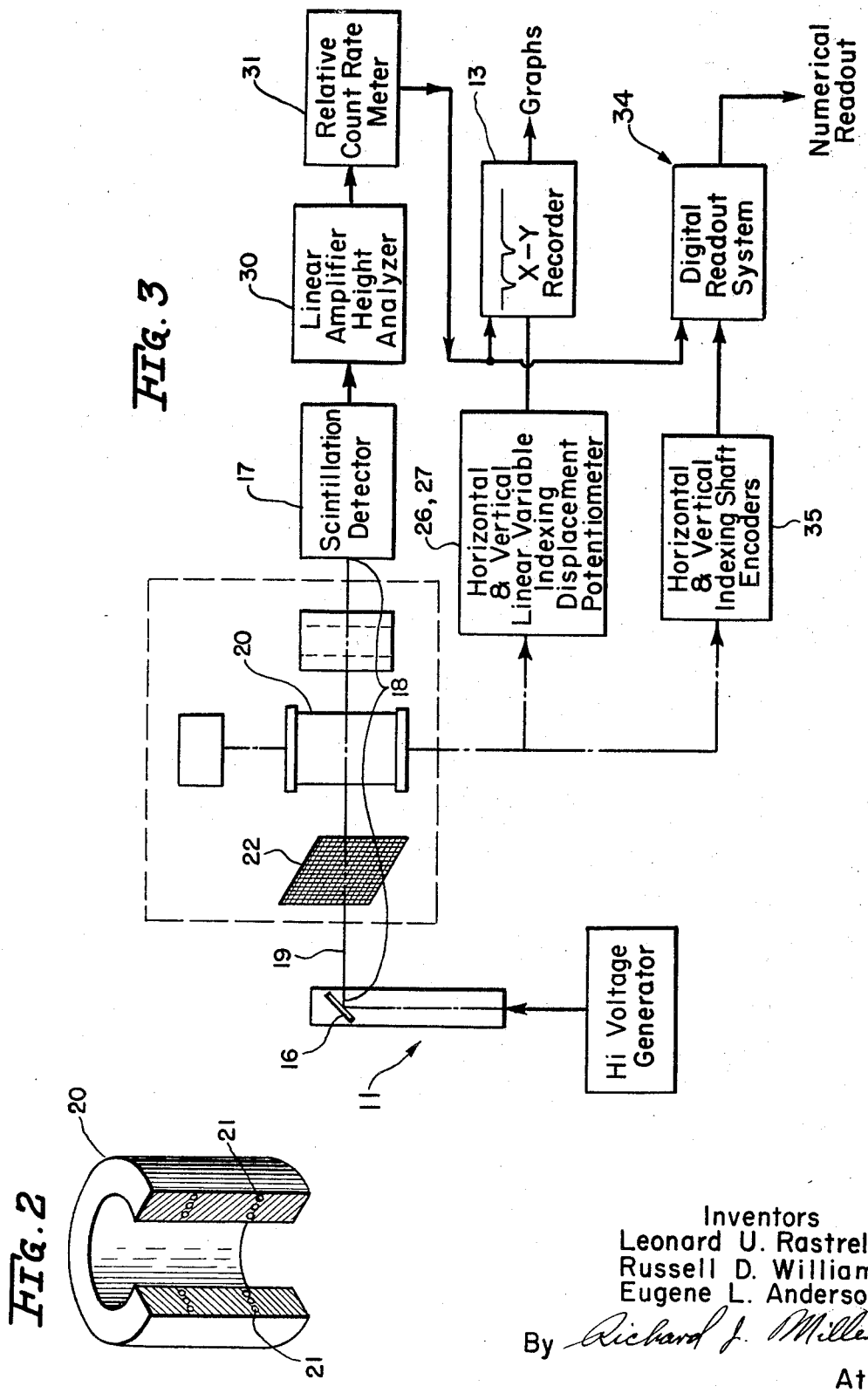

Inventors
Leonard U. Rastrelli
Russell D. Williams
Eugene L. Anderson

United States Patent Office 3,412,243
Patented Nov. 19, 1968

3,412,243
X-RAY APPARATUS FOR MEASURING INTERNAL STRAINS IN AN ELASTOMERIC BODY HAVING SPACED PARTICLES EMBEDDED THEREIN
Russell D. Williams, Eugene L. Anderson, and Leonard U. Rastrelli, San Antonio, Tex., assignors, by mesne assignments, to the United States of America as represented by the Secretary of the Navy
Filed Jan. 25, 1965, Ser. No. 427,993
5 Claims. (Cl. 250—51.5)

ABSTRACT OF THE DISCLOSURE

This invention relates to an apparatus for determining internal stresses in a specimen having a predetermined density variation which varies the X-ray absorption of the specimen so that stressing the specimen will vary the location of density-variation which variations are reproduced on an X-Y recorder.

---

This invention relates to strain gauges and more particularly to an apparatus for measuring internal strain in an elastomeric material.

It is often desirable to measure the strain distributions within viscoelastic or elastomeric bodies as for example, the fuel grains of solid rocket propellents. The attachment of external devices, gauges, lead wires, and the like, to such elastomeric material usually results in the introduction of very high error into the accumulated data, because of the low strength moduli of such material.

The present invention relates to an apparatus for the facilitated measurement of such internal displacements and strains.

It is an object of the present invention to provide a new improved apparatus for the measurement of internal strains of elastomeric material.

It is another object of the present invention to provide an apparatus for measuring the internal strain in an elastomeric mass by determining the relative movement of spaced, density-variation points within the mass and including means providing a high energy field, means indexing the elastomeric mass within said high energy field under varying load conditions, and additional means for detecting the attenuated energy passing through the elastomeric mass.

Other objects and advantages of the present invention will become apparent when taken in connection with the following description and drawings which:

FIGURE 2 is a fragmented perspective view showing a test specimen;

FIGURE 3 is a block diagram showing the various elements of the apparatus;

Structures which are composed of a relatively large mass of elastomeric or viscoelastic material usually involve a unique set of structural design and analysis problems. As the thickness of the member increases, the exact nature of the load-induced distortions of the specimen between the observable surfaces becomes more significant and less definitive. For certain materials whose deformational properties are predictable and relatively simple, it may be expedient and valid to make assumptions regarding the strain gradients throughout the thickness of the body. On the other hand, for those materials which exhibit time-and-temperature dependent, non-linear properties, such assumptions become less and less reliable and affect the structural integrity of the mass. The present invention involves an apparatus for measuring the internal deformation of such masses.

Basically, the inventive apparatus described more fully herein involves indexing a test specimen with reference to a fixed X-ray beam position, detecting the X-ray beam after it passes through the specimen and feeding the output from the detector to electronic devices adapted to transform the analog information to digital data. The approach in accordance with the present invention is to utilize small embedded particles as reference points within the test specimens for the acquisition of displacement measurements. Since these particles are not signal-generating devices, their relative motions must be observed and measured either optically or, in a case of opaque materials, with an X-ray device, described more fully hereinafter.

Quantitative external and internal measurements of the particles' mechanical response to load when embedded in viscoelastic specimens are obtained electromechanically with a microfocus X-ray system. The system translates analog intelligence into relative displacement data by absorbing X-ray and electrical information and then directly presenting this information in the form of graphs or numerical read-outs.

Figure 1:
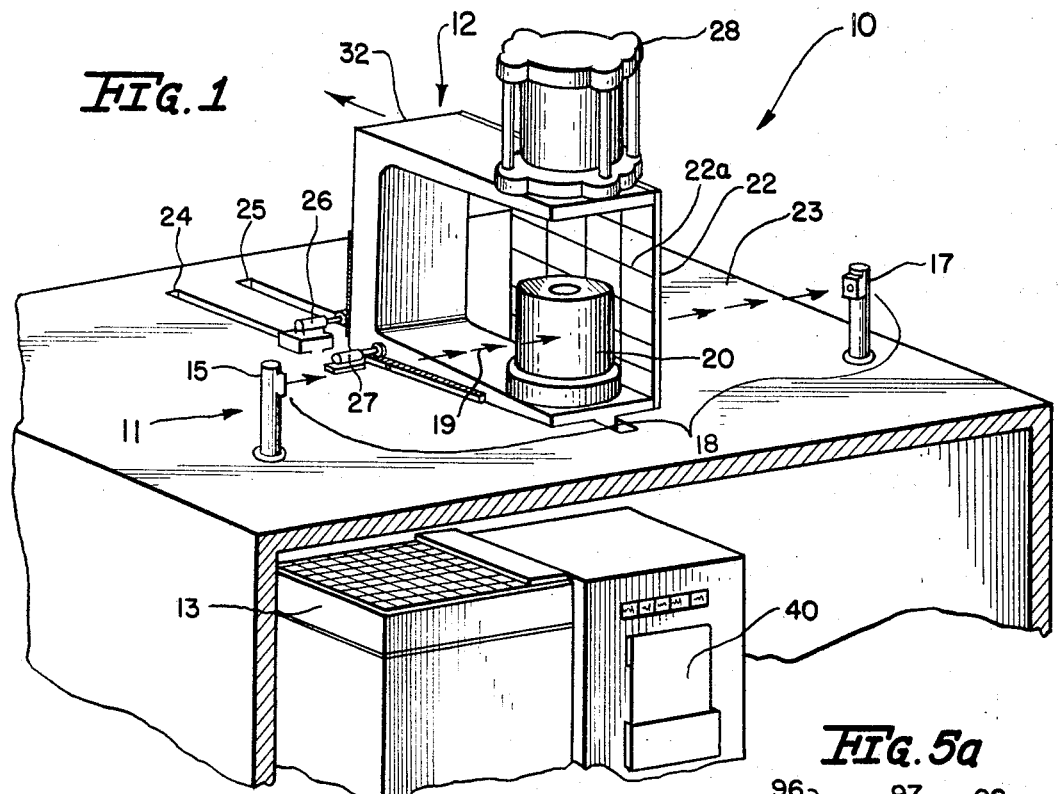
FIGURE 1 is a pictorial representation showing an apparatus embodying the present invention.

Referring more particularly to the figures there is shown a detection apparatus, designated generally at 10, composed generally of an X-ray facility, designated generally at 11, and a mechanical indexing facility, designated generally at 12, both connected to an X-Y recorder 13. Referring to FIGURE 1, X-ray facility 11 consists of a high voltage generator (not shown) for providing an accelerating voltage in the range of, preferably, 80 kilovolts. A narrow geometry X-ray beam depicted at 19, is formed by reducing the electron beam within the X-ray tube 15 to a narrow focal eclipse on a tungsten target anode 16. This anode 16 oriented so that beam 19 is propagated in the direction of and impinges on a scintillation detector 17, of the sodium iodide crystal type. Detector 17 may be equipped with a slit collimator (not shown) designed to inhibit detector exitation by parasitic, scatter radiation thereby permitting the examination of relatively small cross sectional areas on the order of .075 square inch.

Referring now to FIGURE 3, scintillation detector 17 output is introduced to transistorized linear amplifier and pulse height analyzer 30, this amplified signal then driving a transistorized relative count-rate meter 31 and this signal, in turn, providing excitation for recorder 13 and the numerical read-out equipment described more fully hereinafter. The space between anode 16 and detector 17 may be defined as the test or energy field 18. Within this field a test specimen or model grain 20 may be positioned by indexing facility 12 which is also more fully described hereinafter.

As shown in FIGURE 2, typical test specimen 20 has a plurality of small, preferably metallic particles 21 embedded within the model during casting. Such particles 21 absorb a relatively greater amount of X-ray energy than the surrounding grain. Thus, the embedded particles are located by recording the relative attenuation of the rays impinging on detector 17. It is noted that the spaced particles need not be metallic but only that their densities be different than the material of the test specimen. Thus, the existence of spaced voids would provide the necessary points of reference since these voids would effect the attenuation of the rays and their location and relative movement discernible. As shown in FIGURES 1 and 3, attached to and tracking with the mechanical indexing system 12, preferably, is a reference grid 22. Grid 22 provides a recorded fixed and known dimension on the X-Y recorder trace for calibration purposes. Grid 22 may consist, for example, of .005 inch diameter copper wires 22a spaced approximately one inch apart and embedded in plastic. Tube 15 and detector 17 are fixed in position on a table or platform 23. Indexing facility 12 is preferably driven by electric motors (not shown), is adapted to index the test specimen vertically and horizontally relative to the beam 19 and is provided with tracks 24, 25 for this purpose. Mechanically linked to the indexing system in a suitable manner are potentiometers 26 and 27 which are excited with a continuous and unvarying direct current source (not shown). Potentiometer 26 is linked to provide data related to the vertical displacement of frame 32 and potentiometer 27 is linked to provide data related to the horizontal displacement of frame 32. Thus, movement of the indexing frame 32 provides an electrical output which is linearly related in amplitude to the displacement of the test model relative to beam 19. This potentiometric signal is fed directly to the X axis of X-Y recorder 13, as indicated in FIGURE 3. Potentiometers applied in a circuit of this type are preferably chosen on the basis of satisfactory linearity and resolution. Success has been achieved with the use of two Borg 1000 ohm, ten-turn potentiometers.

Simultaneously, the signal from detector 17, amplifier 30, and meter 31 is fed into the Y axis of X-Y recorder 13 and the combined signals produce a trace of distance versus X-ray intensity. Preferably, signal amplification and therefore the trace magnification may be controlled at recorder 13 to yield optimum values of resolution consistent with recorder capacity and measuring capabilities. It is pointed out that the linear displacement potentiometers 26 and 27, each having a separate energy source, the signal output levels may be selectively varied, thus allowing for optimum magnification values, on either the vertical or horizontal scans without change of recorder 13 settings.

The controlled loading of the test specimens may be accomplished with a suitable pneumatic system 28 for subjecting the models to various loadings and may be integrated with indexing system 12 permitting examination of the model while under load.

Preferably as a means for increasing the accuracy of response measurement and the overall efficiency of the data gathering, an electronic digital read-out system designated generally at 34, has been integrated with the apparatus. This system is adapted to automatically record numbers proportional to the scanning distances between the grid wires and the metallic particles in the test specimen. To provide data for read-out system 34 relative to the horizontal and vertical movement of frame 32, separate and more precise linkage (than required for recorder 13) to the indexing system 12 may be effected with the utilization of suitable shaft encoders (not shown), which are represented in the block diagrams of FIGURE 3 and FIGURE 6 by the numeral 34. Movement of frame 32 may be controlled by suitable means as, for example, separate vertical and horizontal precision lead screws (not shown). Encoders 35 are properly connected to said lead screws to provide desirable pulse rates and data. Thus, if encoders 34 provide an output of 1800 pulses per revolution and the lead screws have a .1000 inch pitch (one revolution of lead screw advances the indexing system .1000 inch), a one inch scanning distance is resolved into 18,000 units in the decimal print-out system (10 revolutions per inch multiplied by 1800 pulses per revolution). Basically, this system samples analog intelligence provided by shaft encoder 35 and count-rate meter 31, converts this intelligence to digital pulses, and prints-out digitalized relative locations or displacements.

Figure 6:
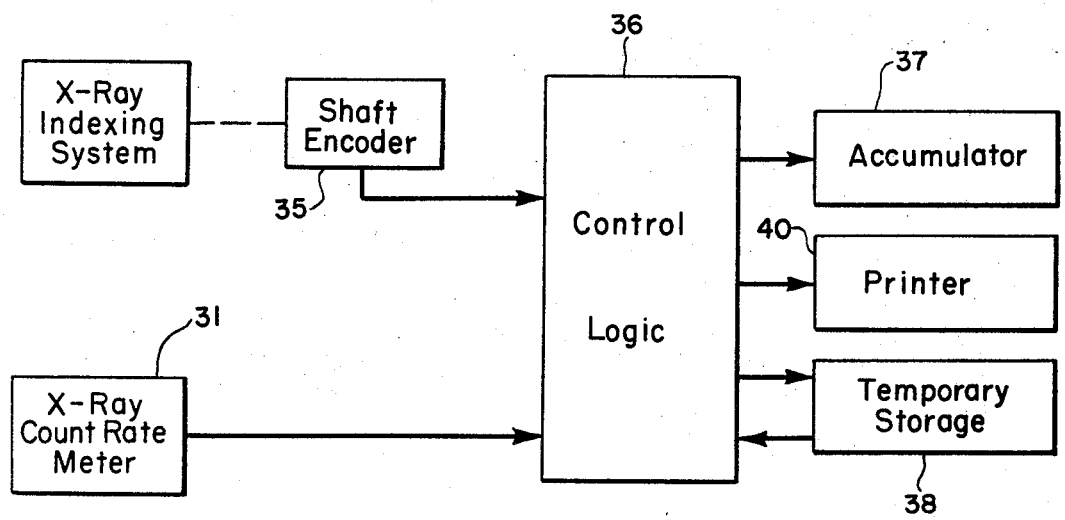
FIGURE 6 is a block diagram representing a digital read-out system embodying the invention.
Figure 7:
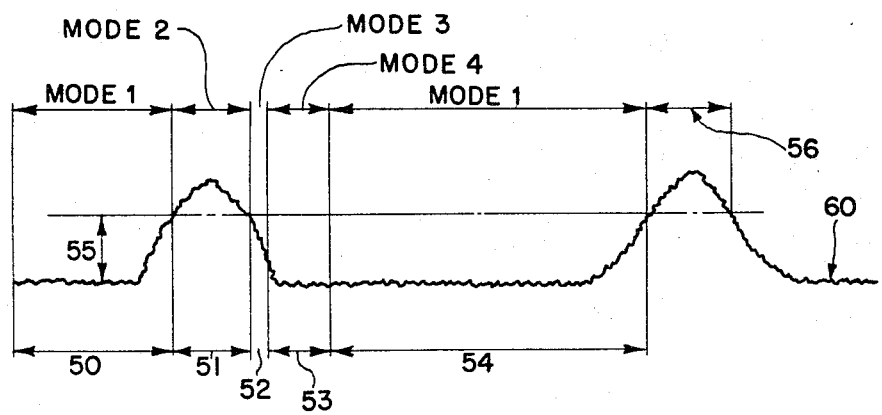
FIGURE 7 is a diagrammatical representation embodying the operational modes of a preferred digital read-out system used in accordance with the present invention.

FIGURE 6 shows a diagrammatic version of digital readout system 34 wherein the inputs to the system are the mechanical drive for the shaft encoder 34 as described, and a voltage with an amplitude proportional to specimen density from count-rate meter 31. As shown in FIGURE 6, the control logic 36 controls the accumulator 37 (a six-place decimal counter which adds the number of pulses from encoders 35), the temporary storage 38 (a reversible digital counter utilized to hold pulses from shaft encoder 35), and a six-column decimal printer 40. As shown in the preferred embodiment, this system utilizes the output signal from count-rate meter 31 to generate the control timing required to determine the effective center location of each grid wire and pellet pulse. The steps required to accomplish this are demonstrated in FIGURE 7 and are explained forthwith. In the initial or reset condition the control system is operating in Mode 1, thus during the scanning distance 50 all shaft encoder 35 pulses are fed directly to accumulator 37. When the inverted count-rate meter 31 output increases to the adjusted preset level 55, the control system shifts operation to Mode 2 and encoder 35 pulses are alternately fed to accumulator 37 and to temporary storage 38. At the end of interval 51 (when the meter 31 output decreases to level 55) the control system operation shifts to Mode 3 (at this time accumulator 37 has stored pulses that represent the distances scanned during interval 50 and ½ of interval 51) and the pulses representing the remaining ½ of interval 51 are stored in the temporary storage 38. A command to print the contents of accumulator 37 (a number representing the scanned interval 50 plus ½ of scan interval 51) is generated and the print-out operation is completed within a present scan interval 52, usually 200 milliseconds. During scan interval 52 the control system is operating in Mode 3 which directs all encoder 35 pulses to temporary storage 38. At the end of the 200 millisecond interval the control system shifts operation to Mode 4 for the scan interval 53. In Mode 4 the encoder pulses and the pulses stored in temporary storage 38 are fed to accumulator 37. When temporary storage 38 has returned to zero the control system shifts operations back to Mode 1 (indicated at 54) and the cycle is begun again. At the end of the second Mode 2 cycle (indicated at 56) the number representing the scanned distance 50, 51, 52, 53, 54, and ½ of 55 is printed. Thus, the center location of each grid wire and particle is determined.

Figure 4A:
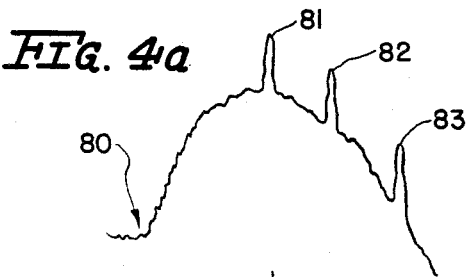
FIGURE 4a is a graphic trace of the test specimen shown in FIGURE 4.
Figure 4:
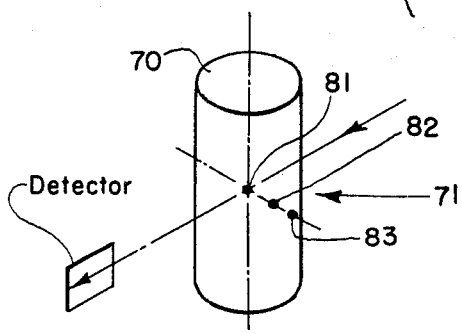
FIGURE 4 is a perspective view of a test specimen with embedded particles.

Referring now to FIGURE 4, when a test model of variable thickness, such as a cylinder 70, is scanned in a direction parallel to a diameter as indicated by arrow 71, the base line of the count rate meter output varies in proportion to the thickness. The trace 80 of this base line is shown in FIGURE 4a. Although, the particles 81, 82, and 83 are still adequately defined, as indicated in FIGURE 4a, the shift in the base line complicates the digital read-out system and is therefore undesirable. A method of controlling this shift in base line trace is to add to the test field attenuation shims of such geometry that the sum of the thicknesses of the model and the shims presents a constant material thickness to the X-ray beam during the scanning operations.

Figure 5A:
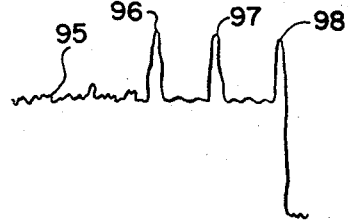
FIGURE 5a shows a graphic trace of the test specimen shown in FIGURE 5.
Figure 5:
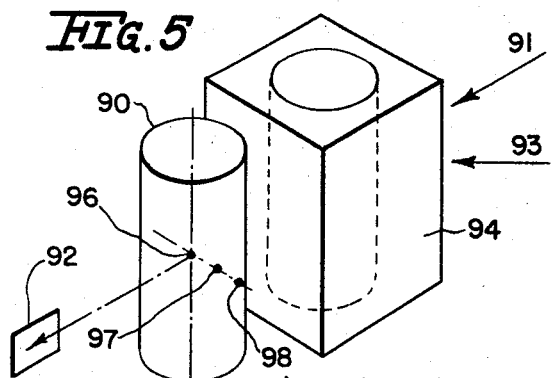
FIGURE 5 shows a perspective representation of another embodiment of a test specimen with embedded particles and an attenuation shim.

Referring to FIGURES 5 and 5a, there is shown an implementation of this refinement, where test cylinder 90, through which an X-ray beam 91 is passing to detector 92, is scanned in the direction as indicated by arrow 93. Cylinder 90 is enclosed by an attenuation shim 94 such that a constant material thickness is presented to the scan resulting in the steady base line trace 95, as indicated in FIGURE 5a. As shown, the three pellets 96, 97, and 98 are adequately represented in trace 95 and complications in the read-out system are avoided.

It is noted that an alternate possible method of controlling the base line shift would be to introduce a second X-ray beam adapted to scan the model in the immediate vicinity of the first beam but not including the particles; these two beams then could be electronically subtracted effectively providing a level base line.

It is noted that particles may be carefully positioned with respect to the test specimen's axis as a means toward simplification of subsequent interpretations of the strain measurements. However, such positioning requires careful segmental casting of each test specimen. To avoid the expense of such care it is usual to allow random placement of the particles. The position of each of the particles may then be accurately determined by the use of the techniques described herein and the testing continued therefrom.

Obviously many modifications and variations of the present invention are possible in the light of the above teachings. It is therefore to be understood that within the scope of the appended claims the invention may be practiced otherwise than as specifically described.

We claim:

1. An apparatus for measuring internal strains in an elastomeric body having spaced particles embedded therein, comprising:
   (a) means generating an X-ray beam and defining an energy field thereby;
   (b) detection means for receiving said beam;
   (c) a movable frame adapted for mountably receiving and disposing said body within said energy field, said beam passing through said body within said energy field, said beam passing through said body and being received by the detection means in an attenuated state related to the particles embedded in said body;
   (d) an X-Y recorder;
   (e) means amplifying and relaying the output of said detector to said recorder;
   (f) signal-generating means connected to the frame and adapted to generate a signal linearly related to the movements of the frame, said signal being delivered to said recorder simultaneously with the detector output, whereby a trace of distance versus beam attenuation is produced and the strains within the body are determined; and
   (g) force developing means, coupled to said frame for selectively loading said body.

2. An apparatus for measuring internal strains in an elastomeric test specimen having spaced particles embedded therein wherein said particles have a density different than that of the elastomeric specimen, comprising:
   (a) stationary means generating an X-ray beam and defining an energy field thereby;
   (b) stationary detection means;
   (c) a movable frame disposed within said energy field, said specimen mounted on said frame, said beam passing through said specimen and being received by the detection means thereafter, said beam being differentially attenuated in accordance with the density variations within said specimen;
   (d) an X-Y recorder;
   (e) means amplifying the signals received by said detection means;
   (f) a count-rate meter receiving said amplified signals and relaying its output to said X-Y recorder;
   (g) potentiometers linked to said frame for generating signals linearly related to the vertical and horizontal movement of the frame, said signals being delivered to said recorder simultaneously with the meter output, whereby said recorder produces a trace of distance versus beam attenuation and the strain within the test specimen are determined;
   (h) a slit collimator associated with said detection means, said collimator inhibiting parasitic excitation of said detector whereby a relatively small area may be examined;
   (i) a reference grid attached to said frame including a plurality of spaced wires, said grid wires providing known dimensions on the recorder trace whereby calibration is facilitated; and
   (j) pneumatic loading means associated with said frame for applying selective loads to the test specimen.

3. The apparatus as described in claim 2 including a numerical read-out system adapted to provide digital data and automatically record numbers proportional to the scanning distance between said grid wires and said particles.

4. The apparatus as described in claim 2 wherein said test specimen has a variable thickness relative to the X-ray scan, comprising:
   (a) environmental control means associated with the specimen and adapted so that said test specimen presents a constant thickness to the X-ray scan whereby complicated shifting in the recorder trace is avoided.

5. The apparatus as described in claim 3 wherein said read-out system includes shaft encoders connected to the movable frame and adapted to generate signals related to the movement of said frame, said signals being delivered to the read-out system along with the output of said count-rate meter whereby a numerical read-out of the accumulating data is effected.

References Cited

UNITED STATES PATENTS

| 2,462,374 | 2/1949 | Firth | 250—51.5 |
| 2,625,850 | 1/1953 | Stanton | 73—88 |
| 2,646,716 | 7/1953 | Bowen | 73—88 |
| 3,244,881 | 4/1966 | Hansen et al. | |

OTHER REFERENCES

Zavodskaya Laboratoriya, Kardonskii et al., 1959, vol. 25, No. 2, pp. 250–252.

ARCHIE R. BORCHELT, *Primary Examiner.*

A. L. BIRCH, *Assistant Examiner.*